United States Patent
Huang et al.

(10) Patent No.: US 6,551,533 B1
(45) Date of Patent: Apr. 22, 2003

(54) METHOD OF FORMING FIBROUS MATERIALS AND ARTICLES THEREFROM

(75) Inventors: Yuhong Huang, West Hills, CA (US); Qiang Wei, West Hills, CA (US); Haixing Zheng, Oak Park, CA (US)

(73) Assignee: Chemat Technology, Inc., Northridge, CA (US)

( * ) Notice: Subject to any disclaimer, the term of this patent is extended or adjusted under 35 U.S.C. 154(b) by 123 days.

(21) Appl. No.: 09/727,018

(22) Filed: Nov. 28, 2000

(51) Int. Cl.⁷ .................. B29B 9/00; C04B 35/624; C04B 40/00
(52) U.S. Cl. .................. 264/13; 264/82; 264/103; 264/104; 264/211.11; 264/236; 264/618; 264/621; 264/623; 264/681
(58) Field of Search .................. 264/13, 82, 103, 264/104, 211.11, 236, 477, 494, 495, 618, 621, 623, 681

(56) References Cited

U.S. PATENT DOCUMENTS

| | | |
|---|---|---|
| 4,562,511 A | 12/1985 | Nishino et al. |
| 5,062,025 A | 10/1991 | Verhoeven et al. |
| 5,080,963 A | 1/1992 | Tatarchuk et al. |
| 5,096,663 A | 3/1992 | Tatarchuk et al. |
| 5,102,745 A | 4/1992 | Tatarchuk et al. |
| 5,601,938 A | 2/1997 | Mayer et al. |
| 5,680,292 A | 10/1997 | Thompson et al. |
| 5,807,430 A | 9/1998 | Zheng et al. |
| 5,841,627 A | 11/1998 | Prakash et al. |
| 5,911,944 A * | 6/1999 | Kitaoka .................. 264/623 X |
| 6,025,020 A | 2/2000 | Chen et al. |

FOREIGN PATENT DOCUMENTS

| JP | 02074526 A | * 3/1990 | .................. 423/76 |
|---|---|---|---|
| JP | 02074527 A | * 3/1990 | .................. 423/598 |

* cited by examiner

Primary Examiner—Leo B. Tentoni
(74) Attorney, Agent, or Firm—Blakely Sokoloff Taylor & Zafman LLP

(57) ABSTRACT

A method including synthesizing polymeric precursors via organic acid modification; fabricating a fibrous material of the polymeric precursors; and fabricating a body of the fibrous material. One body has dimensions suitable as an electrode component of an electrical storage device.

26 Claims, 4 Drawing Sheets

METHOD OF FORMING FIBROUS MATERIALS AND ARTICLES THEREFROM

This invention was made with Government support under contract DASG60-00-M-0148 awarded by the U.S. Army Space and Missile Defense Command. The Government has certain rights in the invention.

BACKGROUND OF THE INVENTION

1. Field of the Invention

The invention generally relates to the field of methods for and products of manufacturing component parts in energy storage devices and more particularly, to high surface area electrodes for supercapacitor applications.

2. Description of Related Art

In general, electrochemical capacitors are capacitive energy storage devices based on double-layer capacitance or pseudocapacitance. The potential, power density and cycle life of electrochemical capacitors are generally two orders of magnitudes higher than those of rechargeable batteries. As compared with batteries, electrochemical capacitors can be characterized as having low energy density, high power density and a high cycle life. Further, in an electric circuit, an electrochemical capacitor behaves more like a classic dielectric capacitor than a battery, hence its name.

The requirement of high energy and power density of an electrochemical capacitor intrigues development in miniaturization and weight reduction. The component parts of an electrochemical capacitor generally include at least two electrodes, electrolyte, and a separator. The material of the electrode is typically a key element. One approach to increase energy and power density of an electrochemical capacitor is to increase the accessible surface area of the electrodes. Generally, the pore size of the electrode material must be large enough to allow electrolyte access into the pores, yet small enough to provide a high surface area per volume or per weight of the electrode material. Lowering the internal resistance (e.g., resistivity of the electrode material or interface resistance between electrode constituents) of the electrode material is also a key point toward increasing conductivity and power density of electrode materials. A contact resistance between an electrode and the electrolyte and/or current collector can also increase the resistance of the capacitor.

There are four basic types of electrode materials for electrochemical capacitor applications. Activated carbon or foam represents one type of electrode material, as disclosed by U.S. Pat. No. 5,601,938. Typical capacitance obtained from an electric double layer is in the range of about 20–40 mF/cm$^2$.

Certain transition metal oxides such as rubidium oxide ($RuO_2$) and iridium oxide ($IrO_2$) possess pseudocapacitance thus rendering metal oxides as a candidate for a second type of electrode material. Pseudocapacitance arises from highly reversible reactions, such as oxidation-reduction ("redox") reactions, which occur at or near the electrode surfaces. Capacitance of 150–200 mF/cm$^2$ have been observed for $RuO_2$ films. A specific capacitance of 380 F/g has been reported using high temperature thermal treatment and 720 F/g with low temperature thermal treatment. Low temperature treatment generally forms amorphous hydra-ruthenium oxide, which tends to crystallize at temperatures above 100° C. Ruthenium electrode material also tends to be relatively expensive. In order to reduce the cost of the expensive ruthenate electrode materials, bi-metal oxides or tri-oxides were studied, such as lead ruthenate systems having a formula $A_2[B_{2-x} Pb_x]O_{7-y}$, where A is lead (Pb) or bismuth (Bi); B is ruthenium (Ru) or iridium (Ir); x is greater than zero and less than or equal to one; and y is greater than zero and less than 0.5 as disclosed by U.S. Pat. No. 5,841,627.

The third type of electrode material is metallic bodies which are mechanically- or chemically-etched to provide a roughened surface and a high specific surface area, as disclosed by U.S. Pat. No. 5,062,025. High surface area metal electrodes are limited by electrochemical stability. Metals are generally unstable in oxidizing environments, therefore their use is generally limited to the positive, reducing electrode or anode.

The fourth type of electrode material is metal nitride. Metal nitrides are generally conductive and exhibit pseudocapacitance. Molybdenum nitride, for example, as pointed out at the Seventh International Seminar on "Double Layer Capacitors and Similar Energy Storage Devices, Dec. 8–10, 1997, Deerfield Beach, Fla., exhibits high energy density.

In addition to the different types of electrode materials, it has been found that the electrical performance of devices based on electrodes of consolidated powders is often limited by inter-particle electrical resistance (e.g., internal resistance), and this requires addition of conductivity-enhancing additives such as metal fibers which are themselves generally not capacitive. Consolidated powders typically have a lower powder density per unit weight of capacitor. U.S. Pat. No. 4,562,511 discusses carbon fiber electrodes. The mechanical strength of the electrode is high, and small type capacitors in various shapes are obtainable, furthermore capacitance per unit volume can be made relatively large and internal resistance and leakage current can be made relatively low.

It is desirable to provide a new type of electrode material with improved mechanical strength, reduced internal resistance and leakage current, and increased capacitance per unit volume. It is also desirable that the new type of electrode material possess high surface area and a desirable pore size.

SUMMARY

The invention relates to a method, including a method of forming a fibrous electrode material. In one embodiment, the method includes synthesizing polymeric precursors via organic acid modification; fabricating a fibrous material of the polymeric precursors; and fabricating a body of the fibrous material.

The invention also relates to an apparatus suitable as an electrode in an energy storage device, including an electrochemical capacitor. The apparatus comprises a body having a fibrous form comprised of a moiety of the general formula:

$$(M_a)_x(Y_b)_y,$$

wherein M is one or more metals (i.e., a is greater than or equal to one) selected from Groups IV through IX of the Periodic Table of the Elements. Examples include, but are not limited to, ruthenium, iridium, and manganese. Y includes one or more heteroatoms (i.e., b is greater than or equal to one) selected from oxygen, nitrogen, carbon, and boron. Subscripts x and y represent the valence state of the cation and anion, respectively. The invention further relates to an apparatus such as an energy storage device. In one embodiment, an energy storage device includes an electrolyte between two electrodes of fibrous material. Advantages of the device described or as formed herein in terms of electrode properties and performance compared generally to prior art devices include: (1) reduced internal resistance and leakage current of the supercapacitive device, therefore improving power density; (2) increased specific surface area of fibrous electrode material, therefore higher energy density; (3) enhanced mechanical strength of the electrode, therefore lowering the contact resistance.

Additional features, embodiments, and benefits will be evident in view of the figures and detailed description presented herein.

BRIEF DESCRIPTION OF THE DRAWINGS

The features, aspects, and advantages of the invention will become more thoroughly apparent from the following detailed description, appended claims, and accompanying drawings in which:

DETAILED DESCRIPTION

Figure 1:
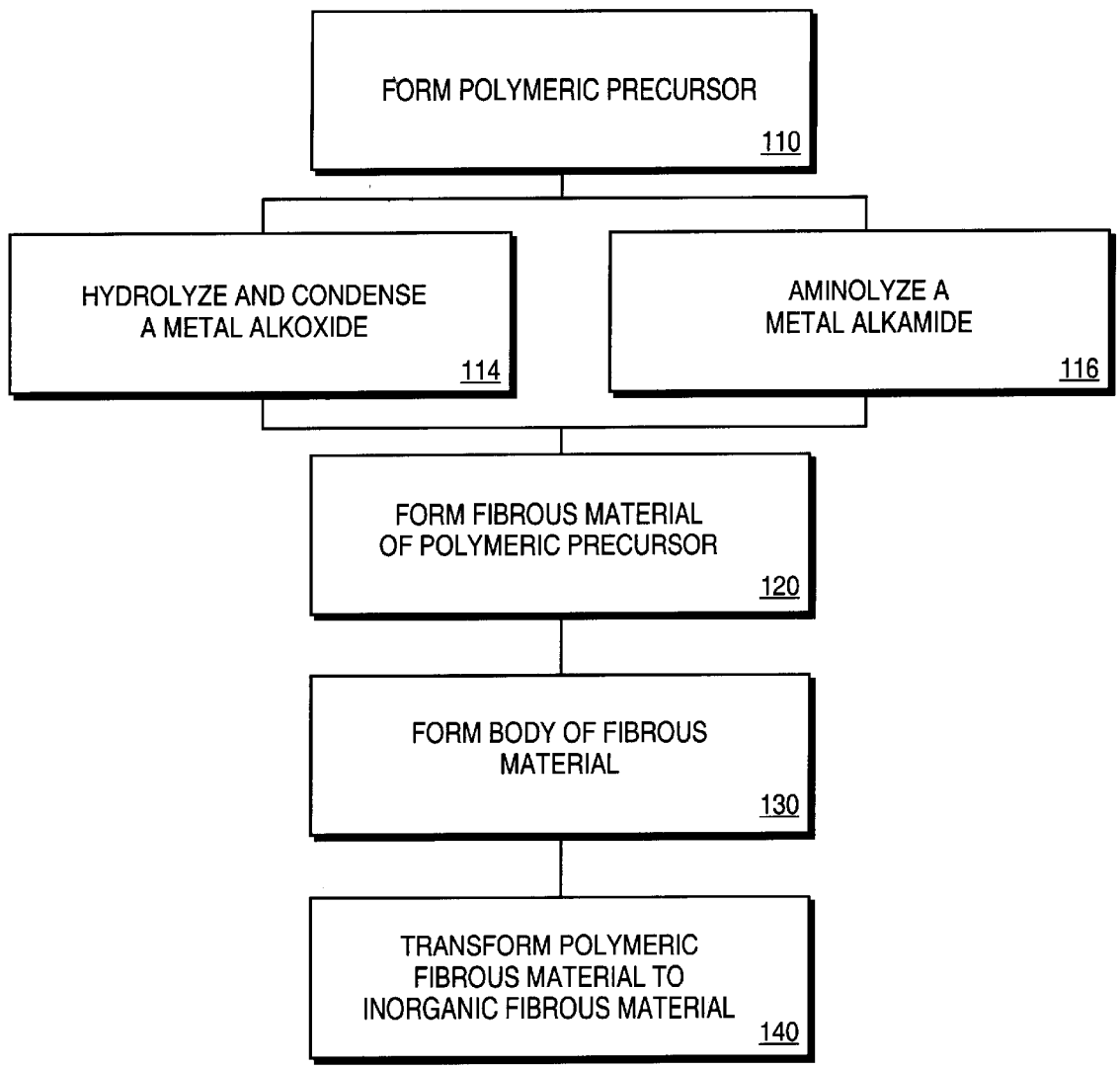
FIG. 1 is a schematic flow of forming a body of fibrous material according to an embodiment of the invention.

In one embodiment, a method is disclosed. The method comprises synthesizing polymeric precursors via organic acid modification and fabricating a fibrous material of the polymeric precursors. The fibrous material is then fabricated into a body of fibrous material. The method of making these fibrous electrode materials include forming whiskers, fibers, clothes, and other collections assembled in the form of fiber electrodes. The method is suitable for forming electrodes for electrical storage devices such as electrodes for electrochemical cells. Such electrical storage devices generally have both a high energy and a high power density with the use of fibrous electrode materials. Such fibrous electrode materials (e.g., nanostructure electrode materials) in electrical storage device applications also show reduced resistance properties both internally (e.g., resistivity and interface resistance between electrode constituents) and externally (e.g., contact resistance) are disclosed with improved mechanical strength.

In another embodiment, an apparatus suitable as an electrode for electrical storage device applications, including electrochemical storage devices, is disclosed. The apparatus includes a body having dimensions suitable as an electrode component of an electrical storage device. The body is composed of a moiety of the general formula:

wherein M is one or more metals (i.e., a is greater than or equal to one) selected from Groups IV through IX of the Periodic Table of the Elements. Examples include, but are not limited to, ruthenium, iridium, and manganese. Y includes one or more heteroatoms (i.e., b is greater than or equal to one) selected from oxygen, nitrogen, carbon, and boron. Subscripts x and y represent the valence state of the cation and anion, respectively. A plurality of such moieties are linked in a fibrous form through the modification of a polymeric fiber to form the body. Such fibrous forms include, but are not limited to, a collection of whiskers, partial or continuous fiber weaves, clothes, or other collections assembled to form the electrode.

Suitable nanostructure electrode materials include nitrides, carbonitrides, oxycarbonitride and/or oxides and methods of fabrication thereof for supercapacitor applications. The electrodes disclosed have reduced internal resistance and leakage current. Such electrodes also offer high mechanical strength which may yield large capacitance per unit volume. One characteristic with respect to fibrous oxides, nitrides, oxynitrides and oxycarbonitrides electrodes according to the invention is reduced resistance. Resistance may be divided into individual components. A contact resistance, $R_1$, between a current collector and electrode; a resistance, $R_2$, attributable to the electrode material itself (e.g., resistivity of electrode material); an interface resistance, $R_3$, between the constituents (e.g., particles) of the electrode; and a resistance, $R_4$, attributable to the electrolyte (e.g., the resistivity of the electrolyte material). The fibrous electrode of the invention show at least a reduced interface resistance, $R_3$. The contact resistance, $R_1$, may also be reduced due to the higher mechanical strength of the fibrous electrode material, therefore permitting the application of higher pressure to compress the electrode and thereby improve the contact between electrode and current collector.

In one embodiment, the invention relates to a method for making and product of nanostructure porous fibrous materials with high specific surface area by utilizing a sol-gel related technology. In one sol-gel process, a precursor solution is subjected to hydrolysis, condensation and polymerization to yield a nanostructure gel. The structure of the gel can be built by controlling the coordination through the electrophillicity of the ligand.

In another embodiment, the invention relates to a method for making and product of nanostructure porous fibrous materials with high specific surface area by amine polymerization. In one process, a precursor solution is subjected to aminolysis to form a polymer.

FIG. 1 illustrates a representative process flow for forming a body of fibrous material according to an embodiment of the method of the invention. Referring to block 110, in a first embodiment, polymeric precursors are prepared by modifying precursor solutions with unhydrolyzed organic acid or other organic ligands. In one example, metal alkoxides are condensed with unhydrolyzed organic acids, esters, or other organic ligands. Suitable metal alkoxides include those of the general formula $M(OR)_x$, where M is selected from one or more metals (e.g., double alkoxides) from the Groups IV through IX of the Periodic Table of the Elements, such as rubidium (Ru), iridium (Ir), and manganese (Mn); R is an alkyl group, having for example, one to eight carbon atoms or carbon atom equivalents; and x is equal to the valence state of the cation. Suitable organic acids include, but are not limited to, 2-ethylhexanoic acid (2-EHA), benzoic acid. Organic esters are also suitable and include, but are not limited to, o-xylene-α,α'-diacetate.

The contemplated alkoxides, when combined with the organic acid, ester or other ligand and optionally water undergo hydrolysis and condensation reactions to form a polymeric network. The organic acid ligand, for example, can be used to hydrolyze the alkoxide and also a chelating agent to link alkoxides together to form a generally non-hydrolyzable chelation bonded polymeric network. Suitable mole ratios of alkoxide to organic acid to water include n:1:0.3 to n:(n−2):1, where n is the valence of the metal. A general representation is:

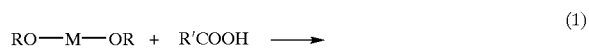

(1)

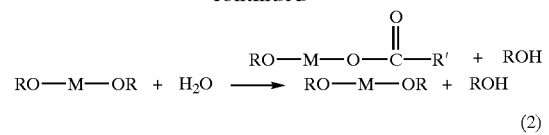

(2)

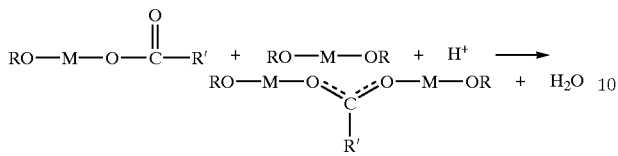

Reaction (1) shows the reaction between the alkoxide and the organic acid and, optionally, the alkoxide and water. Combining the products of reaction (1) produces a polymeric precursor (e.g., a monomer) in reaction (2). The polymeric precursor contains hydrolyzable moieties for further polymerization (the terminal "—OR"), and a non-hydrolyzable moiety represented by the pseudo-carbonyl.

In a second embodiment, polymeric precursors are formed by aminolysis. In one example, metal alkylamides undergo aminolysis by reaction with an amine. Suitable metal alkamides include those of the general formula $M((N_wC_x)R_y)_z$, where M is selected from metals from the Groups IV, V, and VI of the Periodic Table of the Elements, rubidium (Ru), iridium (Ir), and manganese (Mn); R is an alkyl group having, for example, one to eight carbon atoms or carbon atom equivalents; w is one to four; x is zero to three; y is the number of alkyl groups bonded to each nitrogen and/or carbon; and z is the valence state of the cation. Suitable amines are of the general formula $R'NH_2$, where R' includes, but is not limited to, an alkyl of one to eight carbon atoms or carbon atom equivalents.

The contemplated metal alkylamides, when combined with the amine, preferably in the absence of moisture or oxygen to discourage hydrolysis, undergo aminolysis to form the polymeric precursor (e.g., monomer) and a polymeric network. A general representation is:

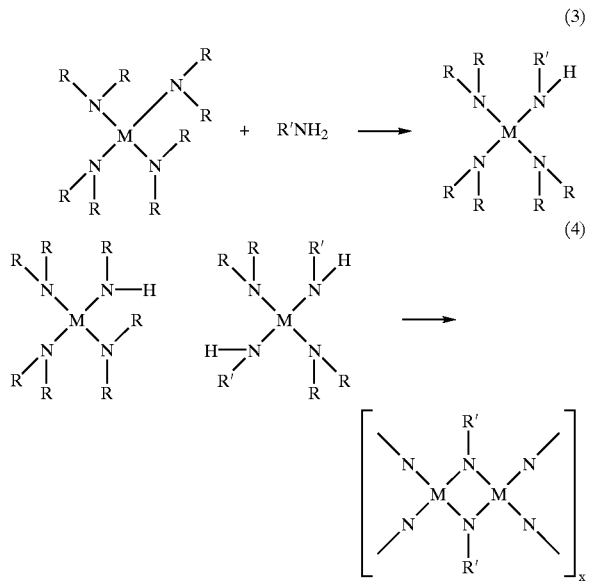

Upon forming the polymeric precursors, block shows that such polymeric precursors may be fabricated into fibrous material, typically by extrusion or spinning. The fibrous material may be short whiskers on the order of a few to several hundred microns to a continuous weavable single strand fiber.

Referring to block 130 in FIG. 1, the fibrous material is transformed into a body of fibrous material suitable for use as an electrode for use in an electrical storage device. In one approach, "green" fibrous materials formed of polymeric precursors through a sol-gel process or aminolysis are dispersed in a cellulose matrix in preparing the body of fibrous materials. The approach is analogous to that described in U.S. Pat. Nos. 5,080,963; 5,096,663; and 5,102,745. The green fibrous materials are dispersed in a fluid medium along with cellulose acting as a binder and matrix for the fibrous materials. The resulting dispersion is then cast into a predetermined shape. One purpose of the cellulose is to permit the fabrication of a solid preform of an otherwise structurally unstable dispersion of fibrous material where the preform can be shaped, stored, and otherwise handled prior to subsequent processing. The cellulose provides a stable, although relatively weak, physical structure which maintains the spatial relationship of the dispersed fibrous materials. Cellulose, in its forms and modifications, is a desirable matrix material because it may be completely volatilized at relatively low temperatures with little ash formation, is generally unreactive toward other components in the preform, and is readily available. Cellulosic materials typically used in the paper-making process are suitable. A person of skill in the art will recognize the elements of the paper-making process in the foregoing description.

After the dispersion of high surface area fibrous materials and cellulose in a liquid is attained, the solids are collected, as on a mat. Excess liquid may be removed, such as by pressing, and the resulting solid dispersion is dried (e.g., liquid is removed) to form a body of fibrous material, especially where it is to be stored prior to further treatment. The drying process may be performed in air, under elevated temperatures, or in a flowing gas. The mass also may be compacted under pressure to a greater or lesser extent. The dispersion may be cast into a predetermined shape prior to, coincident with, or after drying. It may be desirable to cast the dispersion into sheets which can then be rolled up and stored prior to subsequent treatment. The fibrous content of the dry preform may be as low as about 50 weight percent and as high as about 95 weight percent, although typically it will range from about 90 to about 95 weight percent.

In a second approach, fibrous materials formed of polymeric precursors through a sol-gel or aminolysis process are directly pressed, or cast into a sheet, or woven into cloths constituting the body in the absence of a preform, or binder, or matrix. The green sheet or cloths are then subjected to a heat treatment in controlled atmosphere or in air.

Referring to block 140 of FIG. 1, following drying of the body of polymeric fibrous materials, the body is subjected to a sintering process. The sintering process converts a portion, including the entire portion, of the polymeric fibrous material of the body from an organic material to a substantially inorganic material. A suitable sintering process is performed in gaseous ambient, such as, for example, in the presence of oxygen and/or nitrogen for 5 to 20 hours. In one embodiment, the temperature is slowly stepped toward the final desired temperature, residing at the final temperature for 4 to 6 hours. The sintering converts the polymeric fiber to moieties of fiber-like units of generally inorganic (e.g., metal-heteroatoms) of oxides, nitrides, oxynitrides or oxycarbonitrides with desired crystallographic phases, which can be amorphous or crystalline.

By controlling the sintering atmosphere, oxide, carbide, oxycarbide and oxycarbonitride materials can be obtained.

Oxide can be obtained by sintering air. Carbide and oxycarbide can be formed in $N_2/H_2$ atmosphere or in methane. Ammonia gas will promote the formation of the oxynitride, oxycarbonitride and nitride.

Sintering at a low temperature (e.g., 200° C. to 400° C.) produces a generally amorphous phase fiber while sintering at temperatures than 400° C. (e.g., 700° C. to 900° C.) produces a generally crystalline phase fiber. Crystalline phase fibers generally have a decreased surface area and higher conductivity compared to amorphous phase fibers.

In addition to rendering the fibrous material generally inorganic, the sintering process also renders the material porous. In the example of an alkoxide-based polymeric precursor shown as the product of reaction (2), the pseudo-carbonyl gives up its oxygen atom during sintering leaving voids in the network. Similarly, in the alkamide-based polymeric precursor shown as the product of rection (4), the amine gives up its alkyl constituent R' during sintering leaving voids in the network.

Figure 2:
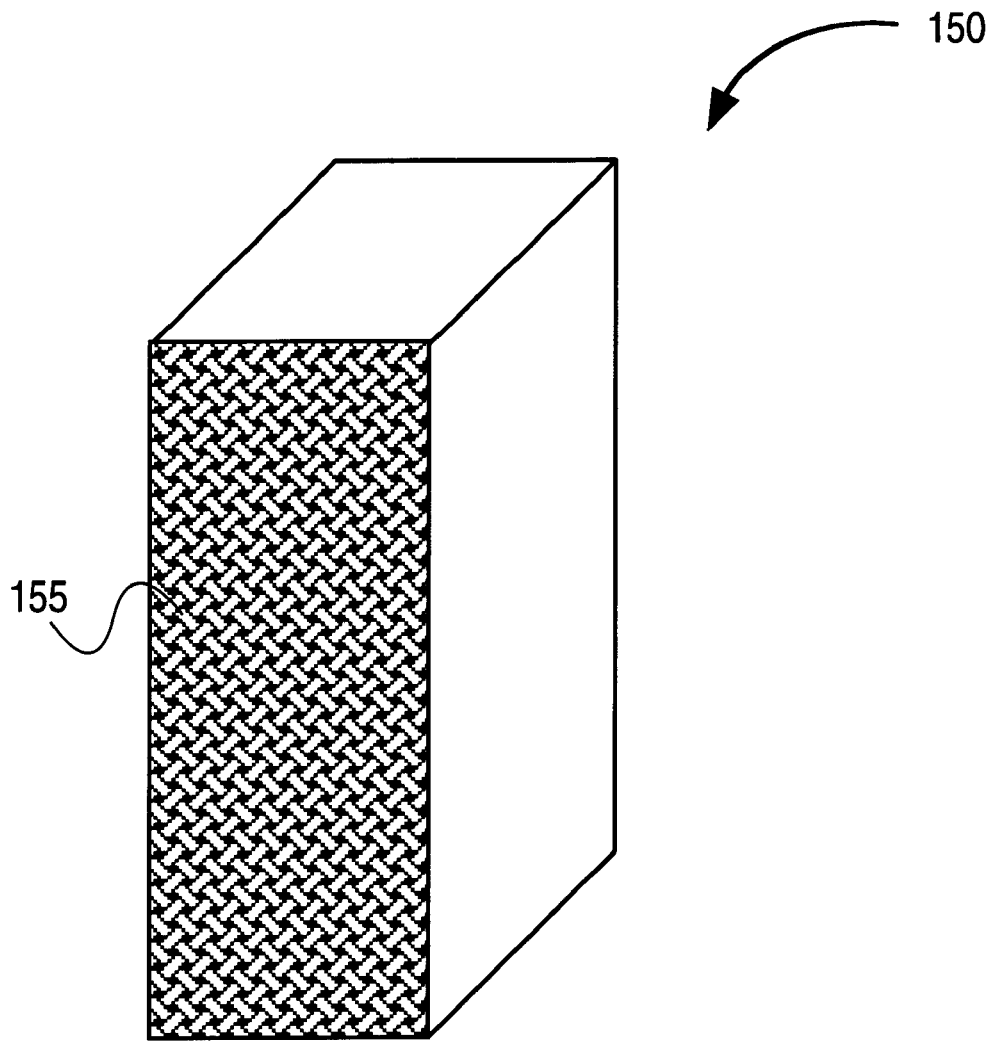
FIG. 2 is a schematic top side perspective view of a body that is an electrode according to an embodiment of the invention.

FIG. 2 shows a body of the inorganic fiber material. Body 150 in this example is formed in the shape of an electrode suitable in an electrical storage device including an electrochemical device (e.g., electrochemical capacitor). It is to be appreciated that the size and dimensions of any such electrode will primarily depend on the scale of the electrical storage device and the suitable applications of an electrode as described herein should not be limited.

Referring to FIG. 2, body 150 is comprised of a plurality of fibers 155 wound, weaved, or otherwise collected. Fibers 155 are compressed to reduce the internal resistance of body ($R_2$). In one example, a collection of weaved fiber materials or a single woven fiber material strand is assembled into a body of 0.5 inches and 0.1 grams of electrode materials is compressed by the application of approximately 2,000 pounds per square inch (psi).

Figure 3:
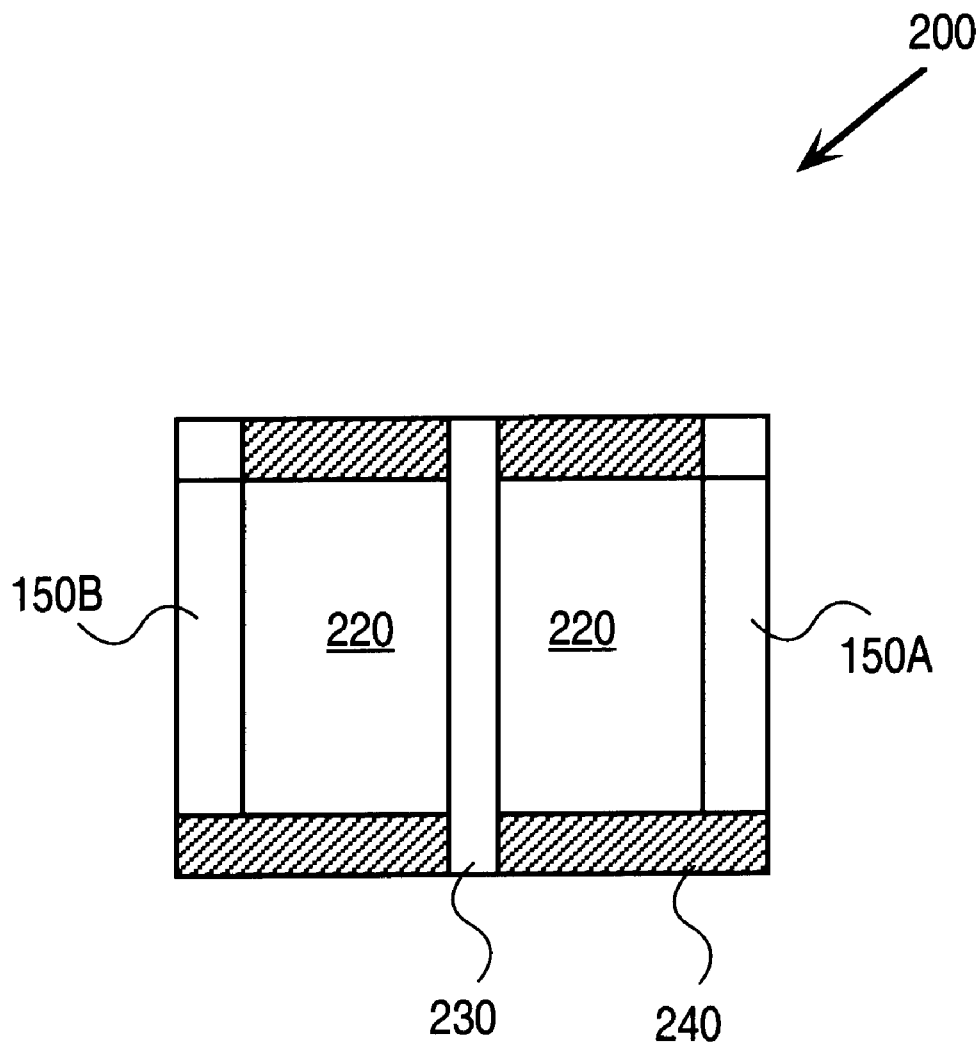
FIG. 3 is a schematic side view of an electrical storage device according to an embodiment of the invention.

FIG. 3 shows an electrical storage device that is an electrochemical device. Electrochemical device 200 includes electrodes 150A and 150B disposed in a cell and separated by separator 230. Electrochemical device 200 also includes electrolyte 220. One example is an electrochemical cell in which an electrical current is produced by chemical reactions. Effecting a chemical change by passing an electrical current or electrolysis are induced by application of a direct current of electricity.

EXAMPLE 1

Synthesis of Spinable Polymer Precursors for Titanium Oxide or Oxycarbonite Polymer precursors are formed by reacting titanium alkoxide with certain cross-linking agents. One example uses titanium isopropoxide, and the cross-linking organics of o-xylene-α,α'-diacetate, 2-ethylhexanoic acid (2-EHA), benzoic acid, or other organic acids.

The carboxylic or carboxolate ligand hydrolyzes the titanium alkoxide and acts as a chelating agent to link titanium alkoxide molecules together. A small amount of water is added to hydrolyze the remaining alkoxide ligands to form a polymeric titanate. Using benzoic acid as the cross-linking organic acid the reactions and polymer structure may be represented as follows:

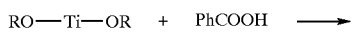

-continued

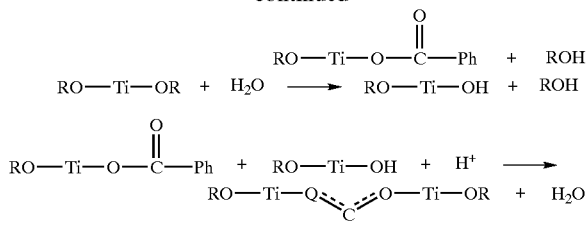

In the above representation, a suitable mole ratio of titanium alkoxide, benzoic acid, and water is 1:1:0.3.

Titanium isopropoxide is dissolved into isopropanol, followed by adding diluted benzoic acid in isopropanol under the stirring. The solution is heated to 80° C. and refluxed overnight. Water is then introduced and the solution refluxed for another two hours. The solution is then heated to 130 to 150° C. under vacuum to remove solvent and form the spinable polymeric precursor. The viscosity can be further adjusted by changing solvent content.

EXAMPLE 2

Fiber Made by Extrusion Process

Fibers obtained from spinning process are homogenous in diameter. Continuous fibers become possible by an extrusion process. Fiber formation is possible when viscosity of the solution is between about 1 to 100 Pa–s. Solvent content and also the extrusion temperature can adjust the viscosity of the polymeric precursor. The diameter of the green fiber can be controlled by orifice diameter, extrusion rate and pick-up rate.

The extruded green fiber can be cured by at least two methods: UV-curing and thermal-curing. Fibers cured at 254 mm UV-light with $320\,\mu m/cm^2$ intensity for 8 hours showed a sufficient cross-linking reaction. The green fiber is cured also at 180 to 250° C. in air for 8 to 12 hours. After curing, the green fiber is converted from thermal plastic to thermal set.

The cured fiber can be sintered at a high temperature and the shape maintained. By controlling the sintering temperature, amorphous or crystalline phase fibrous structures can be obtained.

EXAMPLE 3

High Power Density Supercapacitor by Using Ruthenium Oxide Fibers as Electrodes 1. Procedure for Making Ruthenium Alkoxide and Polymer.

A. Dissolve strictly anhydrous ruthenium chloride in proper amount of tolunene. Sodium metal is added to excess alcohol (e.g., ethanol, isopropanol) to produce sodium alkoxide. Then three equivalent sodium alkoxide is added to ruthenium chloride under stirring. Heat and precipitation is resulted after the addition. The precipitate which is sodium chloride can be removed either by filtration or centrifuge. The reaction equation is shown as below.

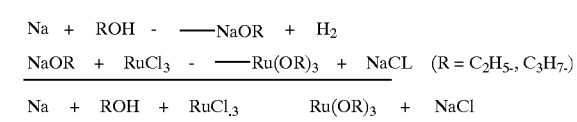

B. Ruthenium alkoxide from procedure A is modified with acetylacetone (aca) and/or 2-ethyl hexanoic acid (2-EHA)

before hydrolysis and polycondensation. The molar ratio of aca and 2-EHA to ruthenium is about 0.5 to 2. After modification, water is added at a molar ratio of about 05. to 1 and the solution is heated and refluxed for about 3 hours. After the polymer has been obtained, most of the solvent was removed by heating in vacuo until the viscosity reaches an empirical value of 4 cm/min. at which the polymer flowed from top to bottom of a vial.

2. Fiber Drawing and Pyrolysis

Polymeric fiber is fabricated by using both hand drawing and spinnete extruding. The obtained fiber is cured in an oven for strengthening to avoid a large shape change in the later high temperature furnace and heat treated in air at 550° C. for more than three hours to burn off the organic content.

3. Fabrication of Ultracapacitor

Figure 4:
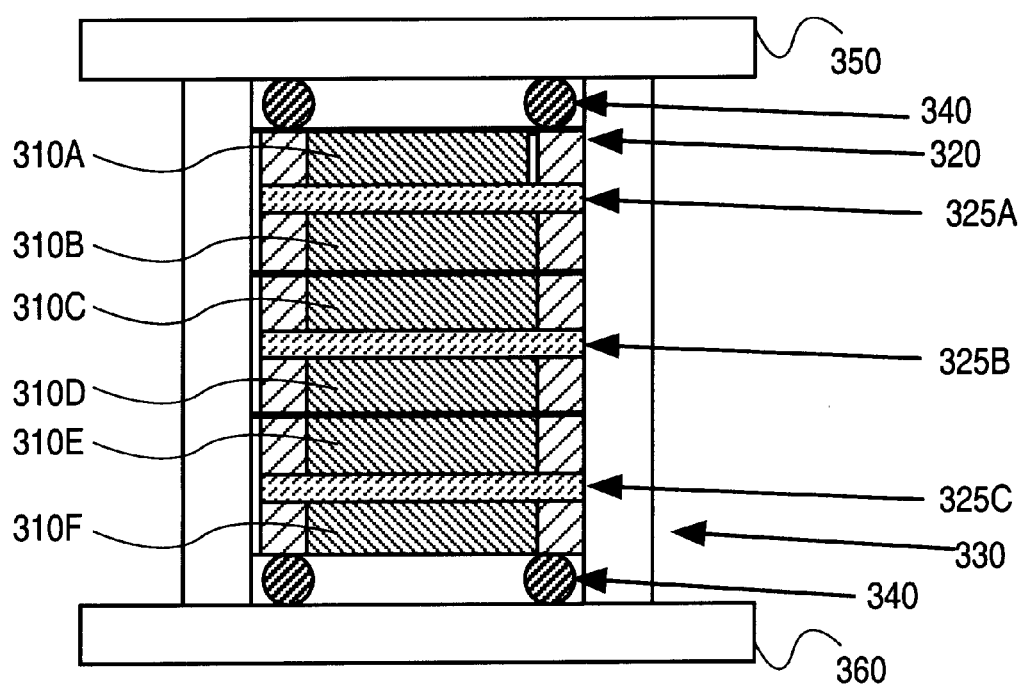
FIG. 4 is a schematic side view of an electrical storage device of a bipolar ultracapacitor.

A schematic of an ultracapacitor is shown in FIG. 4. Ultracapacitor 300 is configured in a bipolar construction. Ultracapacitor 300 includes six capacitors 310A, 310B, 310C, 310D, 310E, and 310F, each with an electrode area of 1 to about 2.85 $cm^2$. Ruthenium oxide fibers were used as the electrode material, and 2.5 M to about 4.5 M sulfuric acid was used as the electrolyte. Current collector 320 in one embodiment is a 0.25 mm thick Ti foil. Glass fiber filter disks 325A, 325B, and 325C are used as the separators. The stack was sealed inside Teflon cylinder 330 with rubber o-rings 340 and aluminum end plates 350 and 360.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising:
   synthesizing polymeric precursors via one of organic acid modification and aminolysis;
   fabricating a fibrous material of the polymeric precursors; and
   fabricating a body of the fibrous material.

2. The method of claim 1, further comprising:
   sintering the body of the fibrous material.

3. The method of claim 2, wherein sintering comprises synthesizing one of an oxide, a carbide, an oxycarbide, and an oxycarbonitride by the introduction into the body of fibrous material of a gas species.

4. The method of claim 1, wherein synthesizing the polymeric precursors comprises polymerizing one of a metal alkoxide and a metal amide.

5. The method of claim 1, wherein synthesizing the polymeric precursors comprises:
   hydrolyzing the metal alkoxide.

6. The method of claim 1, wherein synthesizing the polymeric precursors comprises aminolyzing a metal amide.

7. The method of claim 1, further comprising, after fabricating the fibrous material:
   curing the fibrous material.

8. The method of claim 7, wherein curing comprises one of radiation curing and thermal curing.

9. The method of claim 1, wherein fabricating the fibrous material comprises:
   one of extruding and spinning the polymeric precursors.

10. The method of claim 9, wherein extruding comprises extruding the fibrous material into lengths of fiber on the order of about 10 to 100 microns.

11. The method of claim 1, wherein fabricating the body comprises weaving the fibrous material.

12. The method of claim 1, wherein fabricating the body comprises dispersing the fibrous material in a binder.

13. The method of claim 12, wherein the binder is cellulose.

14. The method of claim 1, further comprising:
   fabricating the body of the fibrous material into an electrode.

15. A method comprising:
   fabricating a fibrous material by one of a sol-gel and a aminolysis process; and
   fabricating the fibrous material into an electrode body.

16. The method of claim 15, wherein fabricating a fibrous material comprises:
   synthesizing a polymeric precursor from a unit having the general formula:

wherein M is a cation comprising a metal selected from at least one of Groups IV through IX of the Periodic Table of the Elements,
   wherein R is an alkyl group having 1–8 carbon equivalents, and
   wherein x is the valence state of the cation.

17. The method of claim 15, wherein fabricating a fibrous material comprises:
   synthesizing a polymeric precursor form a unit having the general formula:

wherein M is a cation comprising a metal selected from one of a group IV metal, a group V metal, a group VI metal, ruthenium, iridium, and manganese,
   wherein R is an alkyl group having 1–8 carbon equivalents,
   wherein w is one to four,
   wherein x is zero to three,
   wherein y is the number of alkyl/groups bonded to each carbon and/or nitrogen, and
   wherein z is the valence state of the cation.

18. The method of claim 17, wherein fabricating the fibrous material comprises:
   one of spinning and extruding the polymeric precursors.

19. The method of claim 18, wherein extruding comprises extruding the fibrous material into lengths of fiber on the order of about 10 to 100 microns.

20. The method of claim 18, further comprising, after one of spinning and extruding, curing.

21. The method of claim 20, wherein curing comprises one of radiation curing and thermal curing.

22. The method of claim 15, wherein fabricating the electrode body comprises weaving the fibrous material.

23. The method of claim 15, wherein fabricating the electrode body comprises dispersing the fibrous material in a binder.

24. The method of claim 23, wherein the binder is cellulose.

25. The method of claim 23, further comprising, after dispersing:
   modifying the fibrous material to an electrode body comprised of moieties of the metal, M, and a heteroatom, Y, selected from the group consisting of oxygen, nitrogen, carbon, and boron.

26. The method of claim 25, wherein modifying comprises sintering by the introduction into the body of fibrous material of a gas species.

* * * * *